US012788150B2

(12) United States Patent
Zhang et al.

(10) Patent No.: US 12,788,150 B2
(45) Date of Patent: Nov. 10, 2026

(54) CONNECTING MECHANISM FOR HEADREST AND SOFT PILLOW, AND HEADREST SOFT PILLOW ASSEMBLY

(71) Applicant: Yanfeng International Automotive Technology Co., Ltd., Shanghai (CN)

(72) Inventors: Xiaocui Zhang, Shanghai (CN); Yineng Shen, Shanghai (CN); Xinze Zhang, Shanghai (CN); Kunjia Gan, Shanghai (CN)

(73) Assignee: Yanfeng International Automotive Technology Co., Ltd., Shanghai (CN)

( * ) Notice: Subject to any disclaimer, the term of this patent is extended or adjusted under 35 U.S.C. 154(b) by 145 days.

(21) Appl. No.: 18/723,542

(22) PCT Filed: Jul. 7, 2022

(86) PCT No.: PCT/CN2022/104393
§ 371 (c)(1),
(2) Date: Jun. 24, 2024

(87) PCT Pub. No.: WO2023/130700
PCT Pub. Date: Jul. 13, 2023

(65) Prior Publication Data

US 2025/0072618 A1 Mar. 6, 2025

(30) Foreign Application Priority Data

Jan. 10, 2022 (CN) ......................... 202220049055.1

(51) Int. Cl.
*A47C 7/38* (2006.01)
*B60N 2/882* (2018.01)

(52) U.S. Cl.
CPC ............. *A47C 7/383* (2013.01); *B60N 2/882* (2018.02)

(58) Field of Classification Search
CPC ................................ A47C 7/383; B60N 2/882
See application file for complete search history.

(56) References Cited

U.S. PATENT DOCUMENTS 6,669,300 B1 12/2003 Lee
11,634,053 B2 * 4/2023 Ilker ...................... A47C 16/00
297/410

(Continued)

FOREIGN PATENT DOCUMENTS

CN 108099723 A 6/2018
CN 207758626 U 8/2018

(Continued)

OTHER PUBLICATIONS

International Search Report and Written Opinion for Application No. PCT/CN2022/104393 mailed Sep. 26, 2022, 14 pages.

(Continued)

*Primary Examiner* — Timothy J Brindley
(74) *Attorney, Agent, or Firm* — Cooley LLP

(57) ABSTRACT

The present disclosure relates to a connection mechanism for a headrest (101) and a soft pillow (100), and a headrest-soft pillow assembly comprising the connection mechanism. The headrest (101) comprises a rear cover (300), and the connection mechanism comprises: a magnet (150) disposed in the soft pillow (100), and a magnetic metal piece (230) provided in the rear cover of the headrest (101). The connection mechanism is configured to removably connect the soft pillow (100) to the headrest (101) through the magnetic attraction between the magnet (150) and the magnetic metal piece (230). Fastening the soft pillow (100) to the headrest (101) by magnetic attraction may not affect the movement and performance of the headrest (101) and meanwhile facilitates easy, rapid mounting and dismounting of the soft pillow (100). In addition, traceless connection between the soft pillow (100) and the headrest (101) is (Continued)

realized, such that the appearance of the headrest (101) is still kept compact and attractive after the soft pillow (100) is removed.

14 Claims, 12 Drawing Sheets

(56) References Cited

U.S. PATENT DOCUMENTS

| | | | | |
|---|---|---|---|---|
| 12,042,059 | B2 * | 7/2024 | Sin | A47C 7/383 |
| 12,369,716 | B1 * | 7/2025 | Zhang | A47C 31/003 |
| 2011/0204696 | A1 * | 8/2011 | Koehler | A42B 1/24 297/464 |
| 2018/0154813 | A1 | 6/2018 | Kober et al. | |

FOREIGN PATENT DOCUMENTS

| | | | | | |
|---|---|---|---|---|---|
| CN | 110626240 | A | | 12/2019 | |
| CN | 212165382 | U | | 12/2020 | |
| CN | 112848997 | A | * | 5/2021 | B60N 2/879 |
| CN | 213130715 | U | | 5/2021 | |
| CN | 213442212 | U | | 6/2021 | |
| CN | 113081578 | A | | 7/2021 | |
| CN | 214711598 | U | | 11/2021 | |
| CN | 217892598 | U | * | 11/2022 | B60N 2/882 |
| CN | 218661493 | U | * | 3/2023 | |
| CN | 119659442 | A | * | 3/2025 | |
| DE | 202006000426 | U1 | | 3/2006 | |
| DE | 102018212893 | A1 | | 2/2020 | |
| DE | 102018130601 | A1 | | 6/2020 | |
| KR | 101873721 | B1 | * | 7/2018 | A47C 7/383 |
| WO | WO-2023062529 | A1 | * | 4/2023 | B60N 2/6009 |
| WO | WO-2023130700 | A1 | | 7/2023 | |
| WO | WO-2025057206 | A1 | * | 3/2025 | B60N 2/897 |

OTHER PUBLICATIONS

EP Application No. 22918156.5, Extended European Search Report mailed Jan. 2, 2026, Applicant: Yanfeng International Automotive Technology Co., Ltd., 14 pages.

Rosato et al., "Plastic Product Material and Process Selection Handbook," 1st ed., Elsevier Science, (published Jan. 1, 2004; Epub Apr. 18, 2016), 632 pages. DOI: https://doi.org/10.1016/B978-1-85617-431-2.50025-6.

* cited by examiner

CONNECTING MECHANISM FOR HEADREST AND SOFT PILLOW, AND HEADREST SOFT PILLOW ASSEMBLY

RELATED APPLICATIONS

This application is a national stage of International Application No. PCT/CN2022/104393, filed Jul. 7, 2022, which claims priority to Chinese patent Application No. 202220049055.1, filed Jan. 10, 2022. Both of the aforementioned applications are hereby incorporated by reference in their entireties.

TECHNICAL FIELD

The present disclosure relates to the technical field of automotive seats. In particular, the present disclosure relates to a connection mechanism for a headrest and a soft pillow, and a headrest-soft pillow assembly comprising the connection mechanism.

BACKGROUND ART

In order to further enhance the comfortability for passengers' head and neck, a soft pillow has been externally attached to the headrest position of the seat in some luxury automotive at present. Such soft pillow is fastened in the vicinity of the headrest in various ways (for example, by Velcro straps in case of BMW series, by elastic bands in case of Mercedes-Benz E series, and by buttons in case of Mercedes-Benz S series).

However, all of the above fastening ways are defective in some aspects. For example, in case of fastening by Velcro straps, once the soft pillow is removed, a piece of Velcro strap fabric will be left at the corresponding position of the original headrest, which will affect the style of the original headrest and lead to an unsightly appearance of the headrest; fastening by elastic bands has the problem of inconvenient installation and operation, and ligature marks tends to occur on the headrest after the soft pillow is removed; similarly, fastening by buttons may also lead to exposed parts (such as buckle parts matched with the buttons) on the headrest after the soft pillow is removed, which parts may not only occupy some space, but also make the headrest unsightly.

Therefore, there is a demand to improve the existing fastening ways.

CONTENT OF THE INVENTION

An object of the present disclosure is to solve one or more of the above problems and realize other additional advantages.

In a first aspect of the present disclosure, a connection mechanism for a headrest and a soft pillow is provided. The headrest comprises a rear cover, and the connection mechanism comprises: a magnet disposed in the soft pillow, and a magnetic metal piece provided in the rear cover of the headrest, wherein the connection mechanism is configured to removably connect the soft pillow to the headrest via a magnetic attraction between the magnet and the magnetic metal piece.

According to an embodiment of the present disclosure, the connection mechanism further comprises a soft pillow tab, wherein the soft pillow tab is connected to the soft pillow, and the magnet is disposed in the soft pillow tab.

According to an embodiment of the present disclosure, the soft pillow tab is made of a flexible material, and the soft pillow tab itself is also flexible.

According to an embodiment of the present disclosure, the magnet is sewn within the soft pillow tab at a free end of the soft pillow tab.

According to an embodiment of the present disclosure, the free end of the soft pillow tab is provided with a pocket for accommodating the magnet, and the magnet is accommodated in the pocket.

According to an embodiment of the present disclosure, the connection mechanism comprises two soft pillow tabs, two magnets and two magnetic metal pieces, wherein the two soft pillow tabs are connected to left and right sides of the soft pillow respectively, and each of the soft pillow tabs is provided with one magnet therein, and wherein the two magnetic metal pieces are disposed on left and right sides of the rear cover respectively.

According to an embodiment of the present disclosure, the magnetic metal piece is fixed to an inner surface of the rear cover in a vertical direction, so as to enable the magnet and the magnetic metal piece attract each other through the rear cover.

According to an embodiment of the present disclosure, an outer surface of the rear cover is provided with a sliding groove extending in the vertical direction, with a position of the sliding groove corresponding to that of the magnetic metal piece, and the sliding groove is adapted to accommodate the magnet to facilitate magnetic connection between the magnet and the magnetic metal piece.

According to an embodiment of the present disclosure, the soft pillow is configured such that a position of the soft pillow relative to the headrest in a height direction is adjusted via movement of the magnet inside the sliding groove.

According to an embodiment of the present disclosure, the sliding groove has a length greater than or equal to that of the magnetic metal piece, and the magnet has a length less than that of the magnetic metal piece, so that the soft pillow has a predetermined adjustment stroke in the height direction.

According to an embodiment of the present disclosure, the magnetic metal piece is fixed to the outer surface of the rear cover in the vertical direction, so that the magnet and the magnetic metal piece are directly attractable to each other.

According to an embodiment of the present disclosure, the outer surface of the rear cover is further provided with a sliding groove extending in the vertical direction, in which the magnetic metal piece is provided, wherein the sliding groove is also configured to accommodate the magnet to facilitate the magnetic connection between the magnet and the magnetic metal piece.

According to an embodiment of the present disclosure, the magnetic metal piece is fixed to the rear cover by hot melting process.

According to an embodiment of the present disclosure, the rear cover is provided with one or more hot-melt columns, and the magnetic metal piece is provided with one or more securing holes for receiving the hot-melt columns.

According to an embodiment of the present disclosure, the magnetic metal piece is fixed to the rear cover by adhering.

According to an embodiment of the present disclosure, the rear cover is provided with an accommodating groove for accommodating and positioning the magnetic metal piece.

According to an embodiment of the present disclosure, the connection mechanism is configured such that a position of the soft pillow relative to the headrest is adjusted via movement of the magnet relative to the magnetic metal piece.

In a second aspect of the present disclosure, a headrest-soft pillow assembly is provided, which comprises a soft pillow, a headrest, and a connection mechanism according to the present disclosure.

According to an embodiment of the present disclosure, the soft pillow comprises a soft pillow comfort layer.

According to an embodiment of the present disclosure, the headrest comprises a headrest comfort layer and a rear cover.

According to an embodiment of the present disclosure, the headrest further comprises a front cover, the headrest comfort layer comprises headrest foam, and the headrest comfort layer is formed by wrapping the headrest foam over the front cover with a face cover.

According to an embodiment of the present disclosure, the front cover and the rear cover of the headrest are configured to be snap-fitted with each other.

According to an embodiment of the present disclosure, each side of left and right sides of a surface of the front cover facing the rear cover is provided with at least one front cover fixing boss, and each side of left and right sides of a surface of the rear cover facing the front cover is provided with at least one rear cover fixing lug which is adapt to be snap-fitted with the front cover fixing boss.

According to an embodiment of the present disclosure, the front cover fixing boss is configured to extend towards the center of the front cover, while the rear cover fixing lug is configured to extend towards both sides of the rear cover, so that the front cover and the rear cover are snap-fitted together by lapping the front cover fixing boss and the rear cover fixing lug over each other.

It should be noted that aspects of the present disclosure described for one embodiment can be included in other different embodiments, although they are not specifically described for the other different embodiments. In other words, all embodiments and/or features of any embodiment can be combined in any way and/or combination as long as they are not contradictory.

BRIEF DESCRIPTION OF THE DRAWINGS

Aspects of the present disclosure will be better understood after reading the following detailed embodiments in conjunction with the accompanying drawings, in which.

Figure 6:
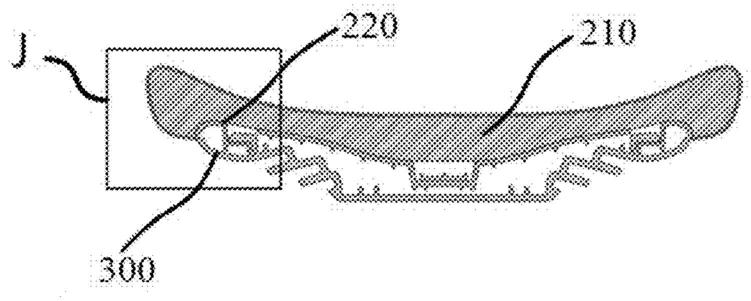
FIG. 6 is a sectional view of the headrest taken along the line A-A of FIG. 3 according to an embodiment of the present disclosure.

FIG. **7*a* is a partial enlarged view of part J of FIG. 6**.

FIG. **7*b*** is a perspective view of a front cover of the headrest according to an embodiment of the present disclosure, in which the specific structure of a front cover fixing boss is shown.

FIG. **7*c*** is a perspective view of a rear cover of the headrest according to an embodiment of the present disclosure, in which the specific structure of a rear cover fixing lug is shown.

Figure 8:
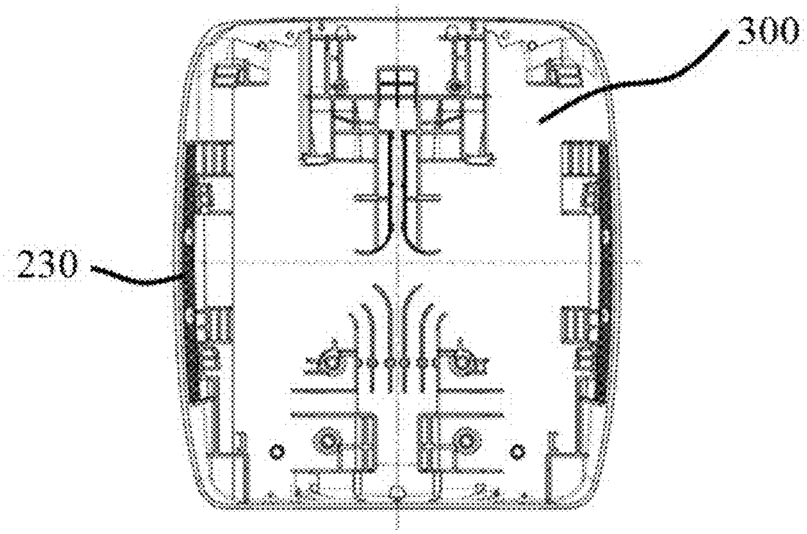

FIG. 8 is an inside front view of the rear cover of the headrest according to an embodiment of the present disclosure, in which the specific mounting position of a magnetic metal piece on the inner side of the rear cover is shown.

Figure 9:
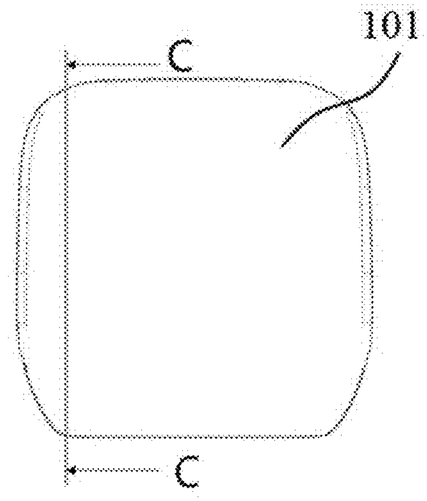

FIG. 9 is a schematic view showing another cutting position of the headrest in an embodiment of the present disclosure.

Figure 10:
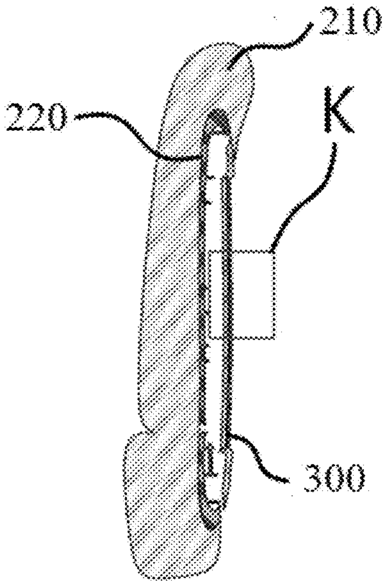

FIG. 10 is a sectional view of the headrest taken along the line C-C of FIG. 9 according to an embodiment of the present disclosure, in which the magnetic metal piece is shown to be fixed to the rear cover of the headrest by bonding.

Figure 11:
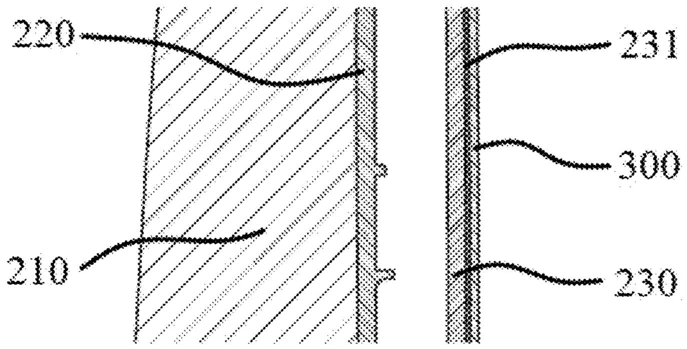

FIG. 11 is a partial enlarged view of part K of FIG. 10.

Figure 12:
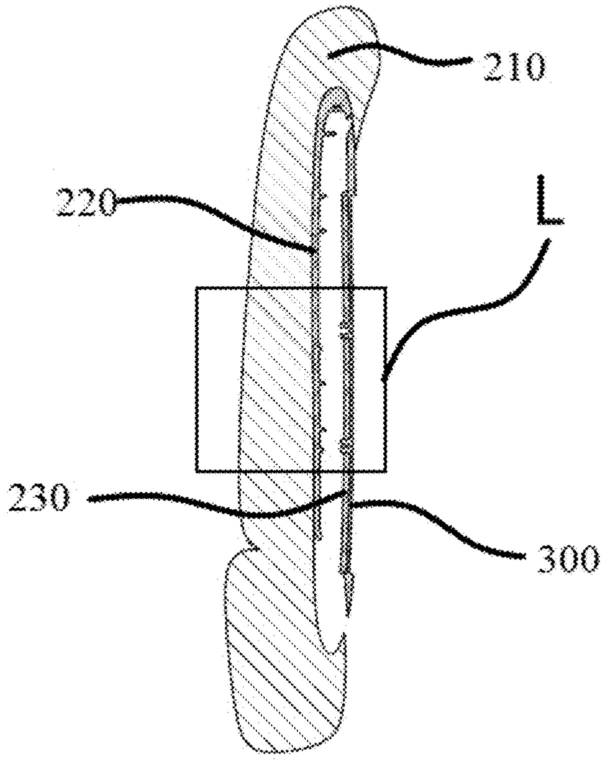

FIG. 12 is a sectional view of the headrest taken along the line C-C of FIG. 9 according to another embodiment of the present disclosure, in which the magnetic metal piece is shown to be fixed to the rear cover of the headrest by hot melting process.

Figure 13:
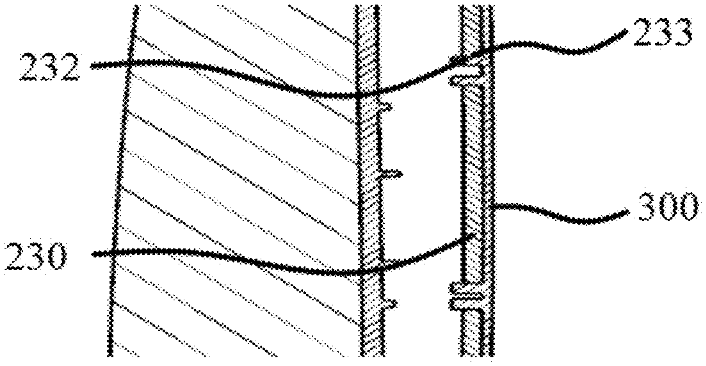

FIG. 13 is a partial enlarged view of the part L of FIG. 12 prior to hot melting.

Figure 14:
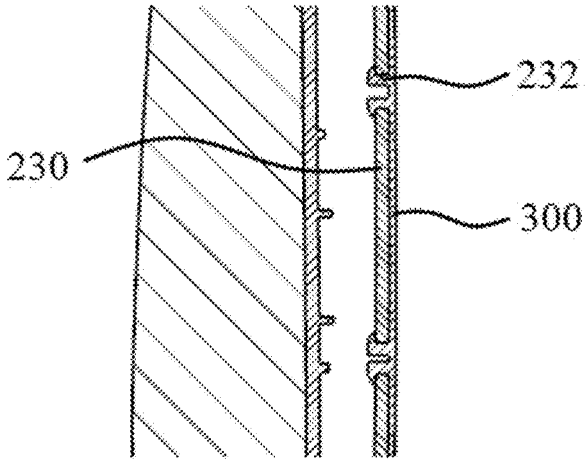

FIG. 14 is a partial enlarged view of the part L of FIG. 12 after hot melting.

Figure 15:
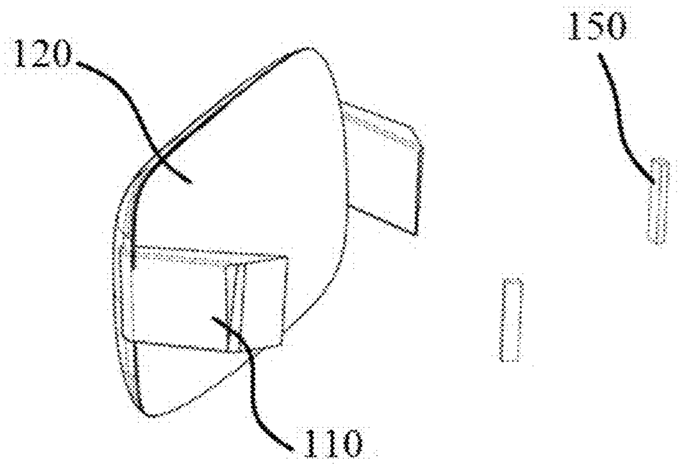

FIG. 15 is an exploded view of the soft pillow according to an embodiment of the present disclosure.

FIG. **16*a*** is a schematic view showing the cutting position of a soft pillow in an embodiment of the present disclosure.

Figure 16A:
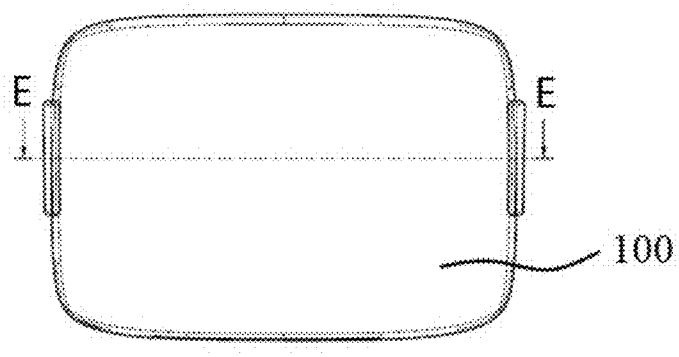

FIG. **16*b* is a sectional view of the soft pillow taken along the line E-E of FIG. 16** according to an embodiment of the present disclosure.

Figure 17:
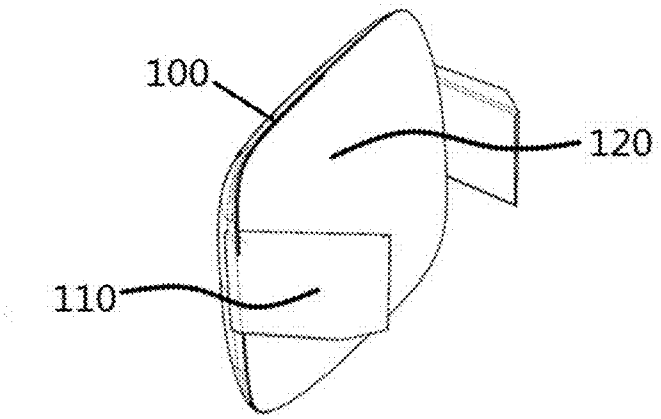

FIG. 17 is a schematic structural view of the soft pillow according to an embodiment of the present disclosure.

Figure 18:
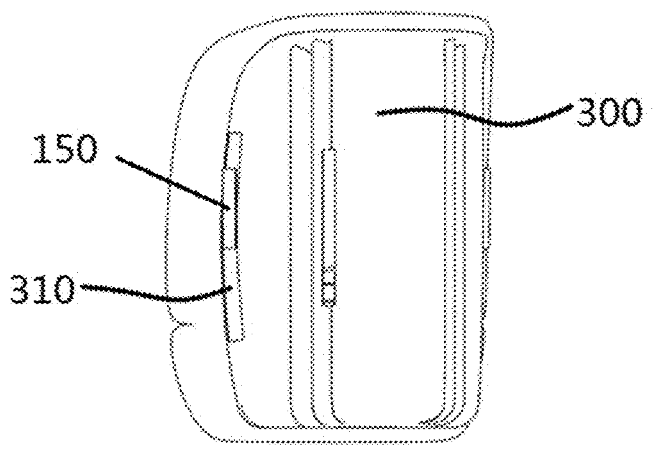

FIG. 18 is a rear side front view of the rear cover of the headrest according to an embodiment of the present disclosure, in which a sliding groove provided on the rear cover is shown.

Figure 19:
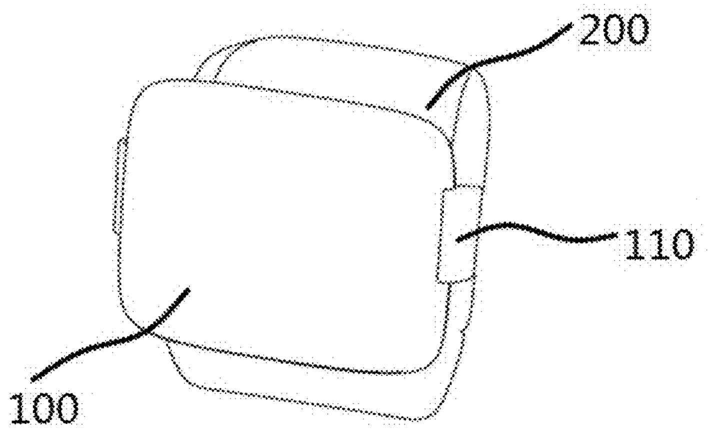

FIG. 19 is a perspective view with the soft pillow and the headrest being connected together according to an embodiment of the present disclosure.

Figure 20:
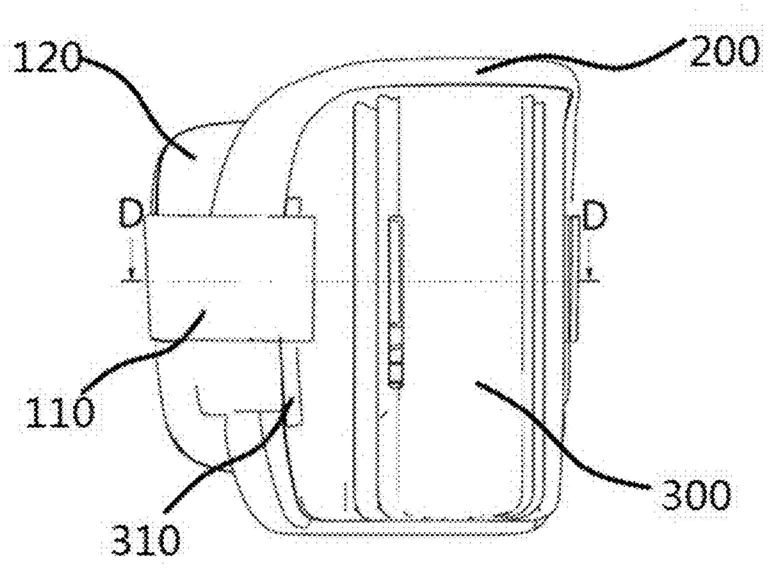

FIG. 20 is a schematic view showing the cutting position of the headrest-soft pillow assembly, in which the headrest and the soft pillow are connected together, according to an embodiment of the present disclosure.

Figure 21:
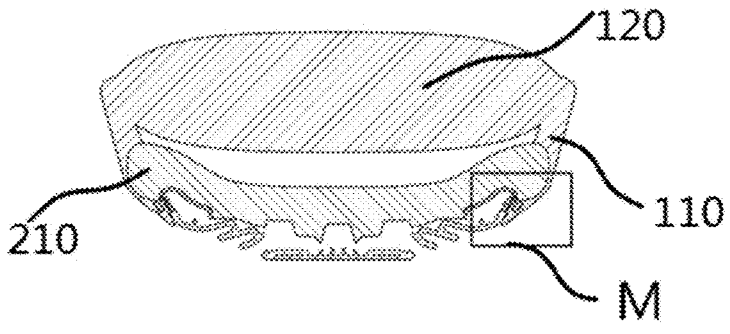

FIG. 21 is a sectional view of the headrest-soft pillow assembly taken along the line D-D of FIG. 20 according to an embodiment of the present disclosure.

Figure 22:
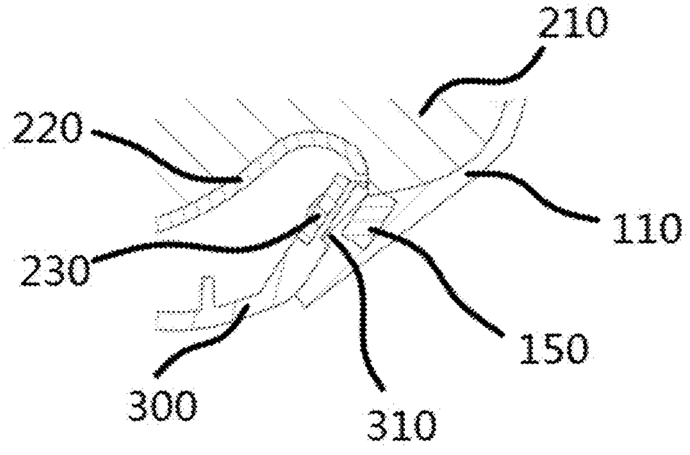

FIG. 22 is a partial enlarged view of part M of FIG. 21.

Figure 23:
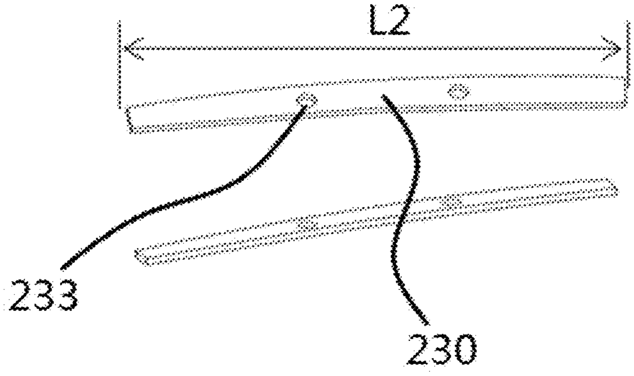

FIG. 23 is a schematic view of the magnetic metal piece according to an embodiment of the present disclosure.

Figure 24:
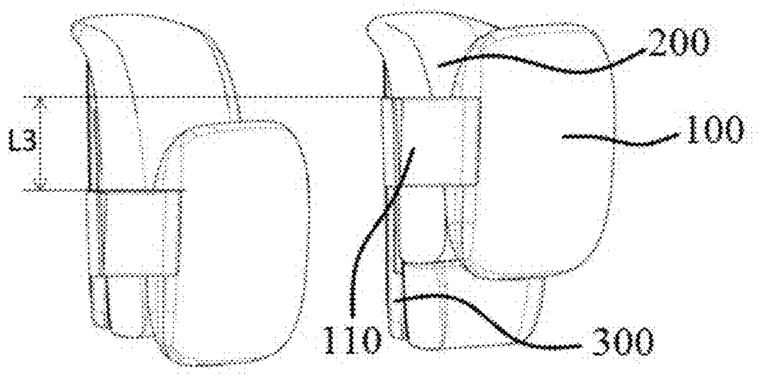

FIG. 24 is a schematic view showing an adjustment stroke of the soft pillow according to an embodiment of the present disclosure.

Figure 25:
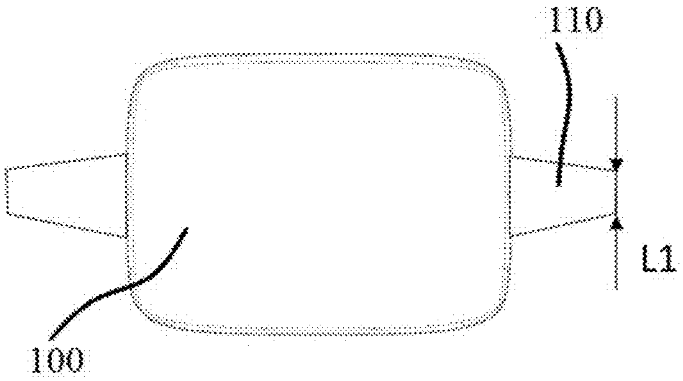

FIG. 25 is a schematic view showing the size of the soft pillow tab according to an embodiment of the present disclosure.

Figure 26:
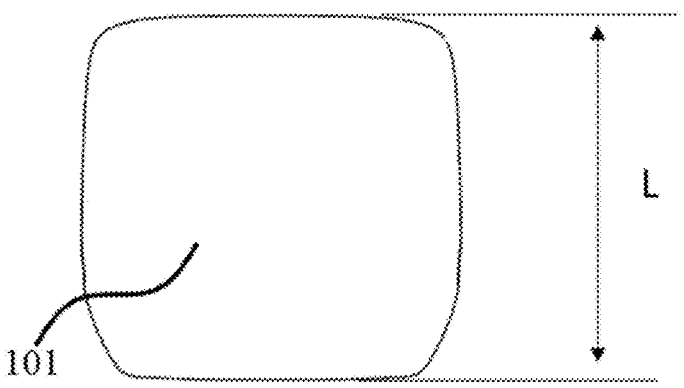

FIG. 26 is a schematic view showing the height of the headrest according to an embodiment of the present disclosure.

DETAILED EMBODIMENTS

The present disclosure will be described below with reference to the drawings, in which several embodiments of the present disclosure are shown. It should be understood, however, that the present disclosure may be implemented in many different ways, and is not limited to the example embodiments described below. In fact, the embodiments described hereinafter are intended to make a more complete disclosure of the present disclosure and to adequately explain the scope of the disclosure to a person skilled in the art. It should also be understood that the embodiments disclosed herein can be combined in various ways to provide many additional embodiments.

It should be understood that the wording in the specification is only used for describing particular embodiments and is not intended to limit the present invention. All the terms used in the specification (including technical and scientific terms) have the meanings as normally understood by a person skilled in the art, unless otherwise defined. For the sake of conciseness and/or clarity, well-known functions or constructions may not be described in detail.

The singular forms "a/an" and "the" as used in the specification, unless clearly indicated, all contain the plural forms. The words "comprising", "containing" and "including" used in the specification indicate the presence of the claimed features, but do not preclude the presence of one or more additional features. The wording "and/or" as used in the specification includes any and all combinations of one or more of the relevant items listed.

In the specification, when an element is referred to as being "on", "attached" to, "connected" to, "coupled" with or "contacting" another element, it can be directly on, attached to, connected to, coupled with or contacting the other element or intervening elements may also be present.

In the description, the terms "first", "second", "third" and the like are used only for convenience of description and are not intended to be limiting. Any technical features represented by "first", "second", "third" and the like are interchangeable.

In the specification, words describing spatial relationships such as "up", "down", "forth", "back", "top", "bottom" and the like may describe a relation of one feature to another feature in the drawings. It should be understood that these terms also encompass different orientations of the apparatus in use or operation, in addition to encompassing the orientations shown in the drawings. For example, when the apparatus in the drawings is turned over, the features previously described as being "below" other features may be described to be "above" other features at this time. The apparatus may also be otherwise oriented (rotated 90 degrees or at other orientations) and the relative spatial relationships will be correspondingly altered.

The present disclosure relates to a connection mechanism for a headrest and a soft pillow, for adjustably fastening the soft pillow to the headrest by means of magnetic attraction. The present disclosure also relates to a headrest-soft pillow assembly comprising the connection mechanism.

Figure 1:
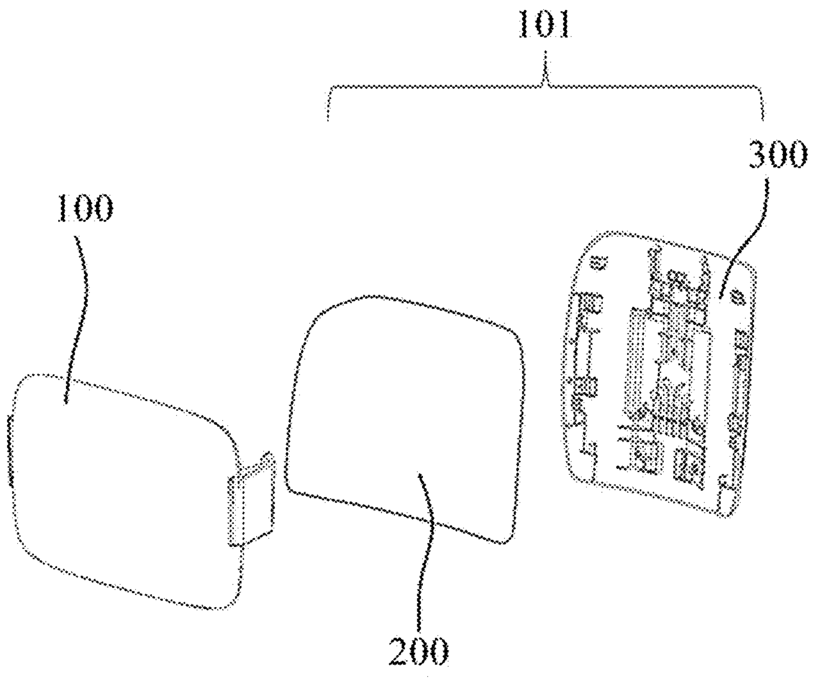
FIG. 1 is an exploded view of a headrest-soft pillow assembly according to an embodiment of the present disclosure.
Figure 2:
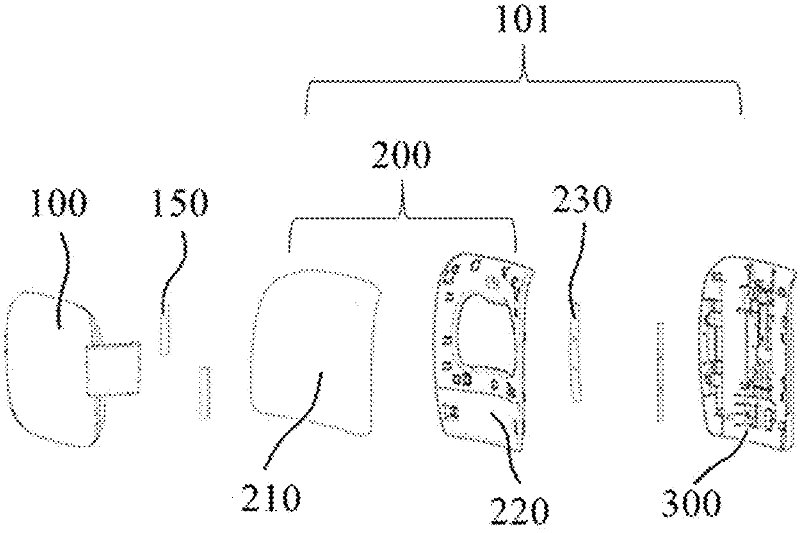
FIG. 2 is a more detailed exploded view of the headrest-soft pillow assembly of FIG. 1, in which a connection mechanism for a headrest and a soft pillow is shown.
Figure 3:
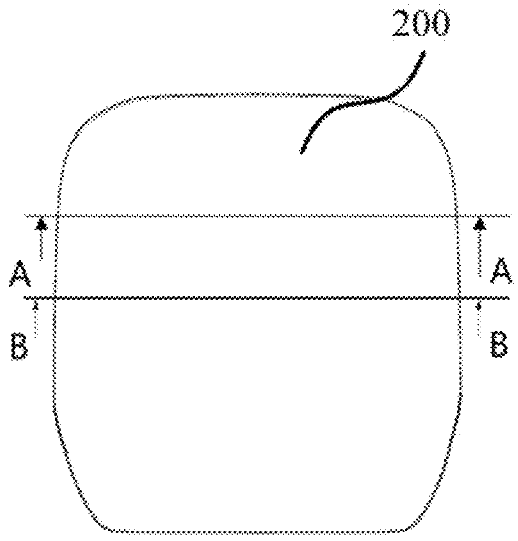
FIG. 3 is a schematic view showing the cutting position of a headrest in an embodiment of the present disclosure.
Figure 4:
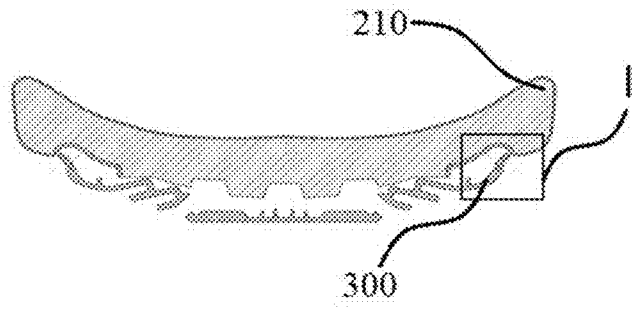
FIG. 4 is a sectional view of the headrest taken along the line B-B of FIG. 3 according to an embodiment of the present disclosure.
Figure 5:
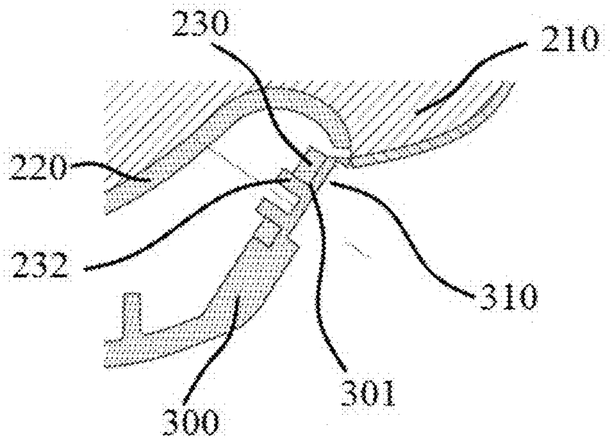
FIG. 5 is a partial enlarged view of part I of FIG. 4.

Refer to FIGS. 1 and 2, which show a connection mechanism for a headrest and a soft pillow according to an embodiment of the present disclosure as well as the specific composition of a headrest-soft pillow assembly including the connection mechanism. As shown in FIGS. 1 and 2, the headrest-soft pillow assembly according to the present disclosure may include a soft pillow 100, a headrest 101, and a connection mechanism for the headrest and the soft pillow. The headrest 101 may include a headrest comfort layer 200 and a rear cover 300. In an embodiment according to the present disclosure, the headrest 101 may further include a front cover 220, and the headrest comfort layer 200 may include a headrest foam 210 (as shown in FIG. 2). The headrest comfort layer 200 may be formed by wrapping the headrest foam 210 over the front cover 220 using a face cover (not shown in the figure), and the headrest comfort layer 200 may be mounted on the rear cover 300 via cooperation of the front cover 220 with the rear cover 300, thus forming the headrest 101.

The connection mechanism for the headrest and the soft pillow according to the present disclosure may include a magnet 150 disposed in the soft pillow 100, and a magnetic metal piece 230 disposed in the rear cover 300 of the headrest 101. The soft pillow 100 may be fixed at an appropriate position of the headrest 101, for example, on a front side of the headrest comfort layer 200 via the magnetic attraction between the magnet 150 and the magnetic metal piece 230. With the aid of this connection mechanism, the soft pillow 100 can be fastened to and/or removed from the headrest 101 simply and quickly without affecting the movement and performance of the headrest 101. In addition, more significantly, the magnet 150 and the magnetic metal piece 230 of this connection mechanism may be provided in the interior of the soft pillow 100 and in the interior of the headrest 101 respectively or at other inconspicuous positions, so the headrest 101 can still maintain a simple and beautiful appearance after the soft pillow 100 is removed from the headrest 101.

In an embodiment according to the present disclosure, the connection mechanism may include two or more magnets 150 and two or more magnetic metal pieces 230. The two or more magnets 150 may be symmetrically arranged on both sides of the soft pillow 100, and the two or more magnetic metal pieces 230 may be symmetrically arranged on both sides of the rear cover 300 of the headrest 101, so that each magnet 150 can cooperate with a corresponding one of the magnetic metal pieces 230 to fulfill connection.

With reference to FIGS. 3-5 and FIGS. 8-14, the arrangement of the magnetic metal piece 230 of the connection mechanism on the rear cover 300 of the headrest 101 will first be described.

In an embodiment according to the present disclosure, the magnetic metal pieces 230 may be fixed, by hot melting process, at corresponding positions of the rear cover 300, for example, on the left and right sides of the rear cover 300. For this purpose, as shown in FIGS. 4 to 5 and FIGS. 12 to 14, the rear cover 300 may be provided with one or more hot-melt columns 232. Correspondingly, as shown in FIG. 23, the magnetic metal piece 230 may be provided with one or more securing holes 233 for receiving the hot-melt columns 232. Upon fixation, as shown in FIGS. 12 and 13, the hot-melt columns 232 of the rear cover 300 may first be made to extend through the securing holes 233 of the magnetic metal piece 230 to thereby localize the magnetic metal piece 230. Then, a hot-melt process is carried out to make the portion of the hot-melt column 232 extending beyond the securing hole 233 hot-melted and radially diffused around the securing hole 233 to form a securing portion substantially in the form of a mushroom head (as shown in FIG. 14). In this way, the magnetic metal pieces 230 are fixed to the rear cover 300 by means of the securing portion of the hot-melt columns 232. In an embodiment according to the present disclosure, in order for better pre-position of the magnetic metal pieces 230 prior to hot melting, an accommodating groove 301 for accommodating and positioning the magnetic metal pieces 230 may be provided on an inner side of the rear cover 300. The accommodating groove 301 may extend in a vertical direction on the inner side of the rear cover 300, and the hot-melt columns 232 may be disposed in the accommodating groove

301 and extend in a direction perpendicular to the inner side surface of the rear cover 300.

In another embodiment according to the present disclosure, as shown in FIGS. 10 and 11, the magnetic metal pieces 230 may be fastened to the inner surface of the rear cover 300 of the headrest 101 by adhering. Any suitable adhesive 231 may be adopted for the adhering operation. During the adhering operation, in order for better pre-position of the magnetic metal pieces 230, the inner side of the rear cover 300 may be provided with an accommodating groove 301 for accommodating and positioning the magnetic metal pieces 230. The accommodating groove 301 may extend in the vertical direction on the inner side of the rear cover 300.

In an embodiment according to the present disclosure, the magnetic metal pieces 230 may be centrally disposed on the left and right sides of the inner surface of the rear cover 300 in a height direction of the rear cover 300. In the case where the rear cover 300 is provided with the accommodating grooves 301, the accommodating grooves 301 may be centrally disposed on the left and right sides of the inner surface of the rear cover 300 in the height direction of the rear cover 300 in the same way to accommodate and position the magnetic metal pieces 230.

In the above embodiments, the magnetic metal pieces 230 are fixed to the inner side of the rear cover 300, which makes the outer side of the rear cover 300 free of any components of the connection mechanism, and thus makes the outer surface of the rear cover 300 have a simple and beautiful appearance. However, the present disclosure is not limited to this. In some embodiments according to the present disclosure, the magnetic metal piece 230 may also be fixed to the outer side of the rear cover 300. In this instance, it is preferable to adhere the magnetic metal pieces 230 to the outer side of the rear cover 300 to keep the outer surface of the rear cover 300 simple and beautiful. Further, it is also preferable to construct the magnetic metal pieces 230 to have the same color as the rear cover 300, so that the magnetic metal pieces 230 can be hidden or concealed visually and the outer surface of the rear cover 300 can thus still look simple and beautiful.

Figure 7A:
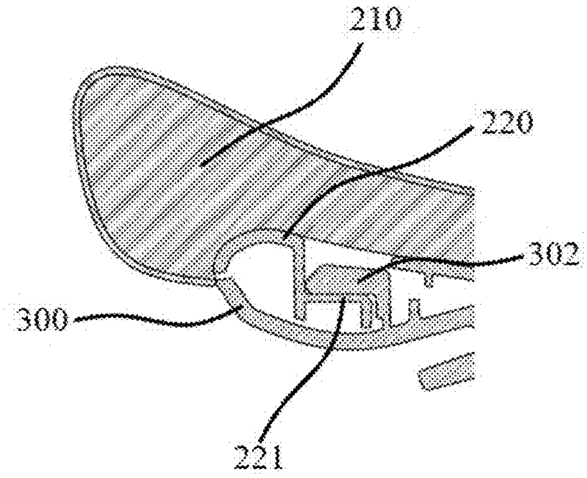
Figure 7B:
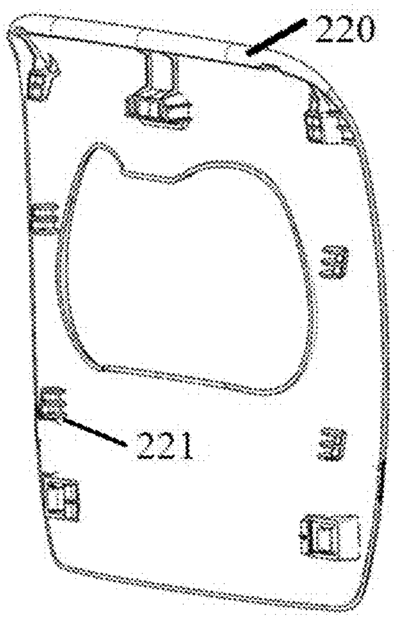
Figure 7C:
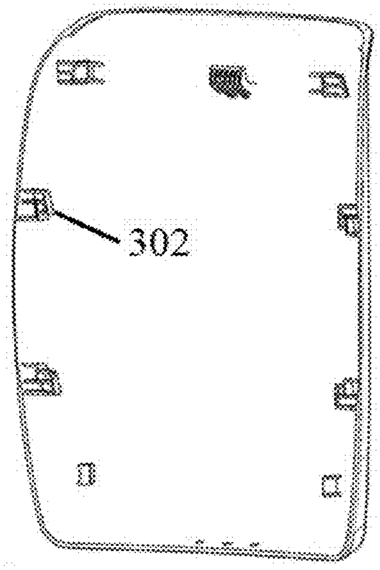

Returning to FIGS. 6 to 7*c*, in an embodiment according to the present disclosure, the front cover 220 and the rear cover 300 of the headrest 101 may be configured to be snap-fitted with each other. Thus, as shown more clearly in FIGS. 7*a* to 7*c*, each side of left and right sides of a surface of the front cover 220 that faces the rear cover 300 may be provided with at least one front cover fixing boss 221 (preferably, each side may be provided with two front cover fixing bosses 221, with a total of four front cover fixing bosses on both sides). Correspondingly, each side of left and right sides of a surface of the rear cover 300 that faces the front cover 220 may be provided with at least one rear cover fixing lug 302 which is snap-fitted with the front cover fixing boss 221 (preferably, each side may be provided with two rear cover fixing lugs 302, with a total of four rear cover fixing lugs on both sides). The front cover fixing boss 221 may be configured to extend towards the center of the front cover 220, while the rear cover fixing lug 302 may be configured to extend towards both sides of the rear cover 300, so that the front cover fixing boss 221 and the rear cover fixing lug 302 may be lapped over each other to thereby snap-fit the front cover 220 and the rear cover 300 together.

Figure 16B:
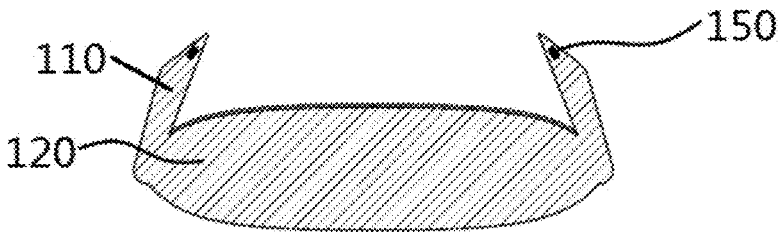

Next, with reference to FIGS. 15 to 17, the arrangement of the magnet 150 of the connection mechanism in the soft pillow 100 will be described. As shown more clearly in FIGS. 15 and 17, the connection mechanism may further include a soft pillow tab 110. The soft pillow tab 110 may be connected to the soft pillow 100, and more particularly, may be connected to the soft pillow comfort layer 120 of the soft pillow 100 (as shown in FIG. 15). In an embodiment according to the present disclosure, the connection mechanism may include two soft pillow tabs 110, which may be connected to the left and right sides of the soft pillow 100, respectively. The soft pillow tab 110 may be made of flexible materials (such as flexible textiles, fabrics or leather products), so that the soft pillow tab 110 itself is also flexible. The soft pillow tab 110 may be sewn onto the soft pillow 100 or the soft pillow comfort layer 120 of the soft pillow 100. However, the present disclosure is not limited to this. The soft pillow tab 110 may also be permanently or removably connected to the soft pillow 100 by other suitable means. The magnet 150 may be disposed at the free end of the soft pillow tab 110 (as shown in FIG. 16*b*), such that the soft pillow 100 can be attracted to the rear cover 300 via the magnetic attraction between the magnet 150 at the free end of the soft pillow tab 110 and the magnetic metal piece 230 disposed on the rear cover 300. In an embodiment according to the present disclosure, the magnet 150 may be sewn within the soft pillow tab 110 at the free end of the soft pillow tab 110. In another embodiment according to the present disclosure, the free end of the soft pillow tab 110 is provided with a pocket for accommodating the magnet 150. The magnet 150 may be disposed within the soft pillow tab 110 by being housed in the pocket of the soft pillow tab 110.

Referring to FIGS. 18 to 22, when the magnetic metal pieces 230 of the connecting mechanism are disposed on the inner surface of the rear cover 300, in order to enable quick and accurate magnetic connection between the magnet 150 and the magnetic metal piece 230, each side of left and right sides of the outer surface of the rear cover 300 may be provided with a sliding groove 310 extending in the vertical direction. The position of the sliding grooves 310 corresponds to that of the magnetic metal pieces 230. When connecting the soft pillow 100 to the headrest 101 via the soft pillow tab 110, the magnet 150 in the soft pillow tab 110 may be first placed in the sliding groove 310, which makes it easy for the magnet 150 to magnetically connect with the magnetic metal piece 230 through the soft pillow tab 110 and the rear cover 300. In addition, the sliding groove 310 may be configured to have a length greater than that of the magnet 150, so that the position of the soft pillow 100 relative to the headrest 101 in the height direction can be adjusted by pushing the soft pillow tab 110 and the magnet 150 therein to move along the sliding groove 310.

In other embodiments, when the magnetic metal pieces 230 of the connection mechanism are disposed on the outer surface of the rear cover 300, in order to enable quick and accurate magnetic connection between the magnet 150 and the magnetic metal piece 230, sliding grooves 310 extending in the vertical direction may also be provided on left and right sides of the outer surface of the rear cover 300 respectively. In this case, the magnetic metal pieces 230 may be disposed in the sliding grooves 310, and the sliding grooves 310 can accommodate the magnets 150 as well, so as to achieve quick and accurate connection between the magnets 150 and the magnetic metal pieces 230. Likewise, the length of the sliding groove 310 may be configured to be greater than that of the magnet 150, so that the position of the soft pillow 100 relative to the headrest 101 in the height direction can be adjusted by pushing the soft pillow tab 110 and the magnet 150 therein to move along the sliding groove 310.

Referring to FIGS. 23 to 26, in order to adjust the position of the soft pillow 100 in the height direction relative to the headrest 101 over a wider range (i.e., to endow the soft pillow 100 with a larger adjustment stroke) so as to adapt to occupants of different heights, when the total height of the headrest 101 is L, the length L2 of the magnetic metal piece 230 may be set to ½L, and the height L1 of the free end of the soft pillow tab 110 may be set to ½L2 (i.e., ¼L). In this way, when the length of the sliding groove 310 is equal to that of the magnetic metal piece 230 (i.e., both are ½L), the adjustment stroke L3 of the soft pillow 100 can be ¼L. In another embodiment according to the present disclosure, the length of the sliding groove 310 may also be configured to be greater than that of the magnetic metal piece 230, so that the soft pillow 100 can have an adjustment stroke L3 greater than ¼L (for example, it may have an adjustment stroke of ⅓L). In this case, the magnet 150 and the magnetic metal piece 230 may only partially overlap each other when magnetically attracted together. By selecting the lengths of the magnet 150 and the magnetic metal piece 230 of the connection mechanism to endow the soft pillow 100 with a desired adjustment stroke, the soft pillow 100 can be adjusted up and down within a certain height range to adapt to passengers of different heights, thereby improving the universality and comfort of the soft pillow 100.

In some embodiments according to the present disclosure, the magnet 150 may be made of rubidium-iron-boron material, the magnetic metal piece 230 may be made of any suitable magnetic metal material (for example, permanent magnet material such as metal alloy, ferrite and intermetallic compound), and the front cover 220 and the rear cover 300 of the headrest 101 may be made of plastic. Of course, the present disclosure is not limited to this. The magnet 150, the magnetic metal piece 230, the front cover 220 and the rear cover 300 may be made of any suitable materials so far as their predetermined functions can be met.

Exemplary embodiments according to the present disclosure have been described above with reference to the accompanying drawings. It should be understood, however, multiple changes and modifications may be made to the exemplary embodiments without substantively departing from the spirit and scope of the present disclosure. All the changes and modifications are encompassed within the protection scope of the present invention as defined by the claims. The present disclosure is defined by the appended claims, and equivalents of these claims are also included in the scope of the present disclosure.

The invention claimed is:

1. A connection mechanism for a headrest and a soft pillow, characterized in that the headrest comprises a headrest comfort layer and a rear cover, the soft pillow comprises a soft pillow comfort layer, and the connection mechanism comprises:

- a magnet provided in the soft pillow; and
- a magnetic metal piece disposed in the rear cover of the headrest;
- wherein the connection mechanism is configured to removably connect the soft pillow to the headrest via a magnetic attraction between the magnet and the magnetic metal piece; and
- wherein the connection mechanism further comprises a soft pillow tab, wherein the soft pillow tab is connected to the soft pillow, and the magnet is disposed in the soft pillow tab; and
- wherein the soft pillow tab is made of a flexible material, and the soft pillow tab itself is also flexible.

2. The connection mechanism according to claim 1, characterized in that the magnet is sewn within the soft pillow tab at a free end of the soft pillow tab; or

- a free end of the soft pillow tab is provided with a pocket for accommodating the magnet, and the magnet is accommodated in the pocket; or
- the connection mechanism comprises two soft pillow tabs, two magnets and two magnetic metal pieces, wherein the two soft pillow tabs are connected to left and right sides of the soft pillow respectively, and each of the soft pillow tabs is provided with one magnet therein, and wherein the two magnetic metal pieces are disposed on the left and right sides of the rear cover respectively.

3. The connection mechanism according to claim 1, characterized in that the magnetic metal piece is fixed to an inner surface of the rear cover in a vertical direction, so as to enable the magnet and the magnetic metal piece attract each other through the rear cover.

4. The connection mechanism according to claim 3, characterized in that an outer surface of the rear cover is provided with a sliding groove extending in the vertical direction, with a position of the sliding groove corresponding to that of the magnetic metal piece, and the sliding groove is adapted to accommodate the magnet to facilitate magnetic connection between the magnet and the magnetic metal piece.

5. The connection mechanism according to claim 4, characterized in that the soft pillow is configured such that a position of the soft pillow relative to the headrest in a height direction is adjusted via movement of the magnet inside the sliding groove;

- the sliding groove has a length greater than or equal to that of the magnetic metal piece, and the magnet has a length less than that of the magnetic metal piece, so that the soft pillow has a predetermined adjustment stroke in the height direction.

6. The connection mechanism according to claim 1, characterized in that the magnetic metal piece is fixed to an outer surface of the rear cover in a vertical direction, so that the magnet and the magnetic metal piece are directly attractable to each other.

7. The connection mechanism according to claim 6, characterized in that the outer surface of the rear cover is further provided with a sliding groove extending in the vertical direction, in which the magnetic metal piece is provided, wherein the sliding groove is also configured to accommodate the magnet to facilitate the magnetic connection between the magnet and the magnetic metal piece;

- the soft pillow is configured such that a position of the soft pillow relative to the headrest in a height direction is adjusted via movement of the magnet inside the sliding groove; and
- the sliding groove has a length greater than or equal to that of the magnetic metal piece, and the magnet has a length less than that of the magnetic metal piece, so that the soft pillow has a predetermined adjustment stroke in the height direction.

8. The connection mechanism according to claim 1, characterized in that the magnetic metal piece is fixed to the rear cover by hot melting process;

- the rear cover is provided with one or more hot-melt columns, and the magnetic metal piece is provided with one or more securing holes for receiving the hot-melt columns.

9. The connection mechanism according to claim 1, characterized in that the magnetic metal piece is fixed to the rear cover by adhering;

the rear cover is provided with an accommodating groove for accommodating and positioning the magnetic metal piece.

10. The connection mechanism according to claim 1, characterized in that the connection mechanism is configured such that a position of the soft pillow relative to the headrest is adjusted via movement of the magnet relative to the magnetic metal piece.

11. A headrest-soft pillow assembly, characterized in that the headrest-soft pillow assembly comprises a soft pillow, a headrest, and the connection mechanism according to claim 1.

12. The headrest-soft pillow assembly according to claim 1, characterized in that the headrest further comprises a front cover, the headrest comfort layer comprises headrest foam, and the headrest comfort layer is formed by wrapping the headrest foam over the front cover with a face cover.

13. The headrest-soft pillow assembly according to claim 12, characterized in that the front cover and the rear cover of the headrest are configured to be snap-fitted with each other.

14. The headrest-soft pillow assembly according to claim 13, characterized in that each side of left and right sides of a surface of the front cover facing the rear cover is provided with at least one front cover fixing boss, and each side of left and right sides of a surface of the rear cover facing the front cover is provided with at least one rear cover fixing lug which is adapt to be snap-fitted with the at least one front cover fixing boss;

wherein the at least one front cover fixing boss is configured to extend towards a center of the front cover, while the at least one rear cover fixing lug is configured to extend towards both sides of the rear cover, so that the front cover and the rear cover are snap-fitted together by lapping the at least one front cover fixing boss and the at least one rear cover fixing lug over each other.

* * * * *